(12) United States Patent
Burenkov et al.

(10) Patent No.: US 12,111,958 B2
(45) Date of Patent: Oct. 8, 2024

(54) SYSTEMS AND METHODS FOR VERIFYING THE INTEGRITY OF A SOFTWARE INSTALLATION IMAGE

(71) Applicant: AO Kaspersky Lab, Moscow (RU)

(72) Inventors: Vladimir S. Burenkov, Moscow (RU); Dmitry A. Kluagin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 321 days.

(21) Appl. No.: 17/453,463

(22) Filed: Nov. 3, 2021

(65) Prior Publication Data

US 2022/0366087 A1 Nov. 17, 2022

(30) Foreign Application Priority Data

May 13, 2021 (RU) ................................ 2021113657

(51) Int. Cl.
*G06F 21/64* (2013.01)
*G06F 8/61* (2018.01)
*G06F 21/57* (2013.01)

(52) U.S. Cl.
CPC ............... *G06F 21/64* (2013.01); *G06F 8/63* (2013.01); *G06F 21/577* (2013.01); *G06F 2221/033* (2013.01)

(58) Field of Classification Search
CPC ...... G06F 21/57; G06F 21/572; G06F 21/575; G06F 21/577; G06F 21/64; G06F 21/6218; G06F 2221/033; G06F 8/63; G06F 8/65

See application file for complete search history.

(56) References Cited

U.S. PATENT DOCUMENTS 6,564,317 B1 * 5/2003 Hale ..................... G06F 9/24
712/E9.007
6,711,675 B1 * 3/2004 Spiegel ................. G06F 9/4401
726/16

(Continued)

FOREIGN PATENT DOCUMENTS

EP 3121750 9/2017
RU 2375739 C2 12/2009

(Continued)

OTHER PUBLICATIONS

Russian Search Report corresponding to Application No. 2021113657 dated May 13, 2021.

(Continued)

*Primary Examiner* — Michael Simitoski
(74) *Attorney, Agent, or Firm* — ArentFox Schiff LLP; Michael Fainberg (57) ABSTRACT

Systems and methods for verifying the integrity of a software installation image before installing the software. Security of the software installation process is ensured by providing access to the software image from a security monitor using security policies. An installation system for protecting the installation of a software image includes instructions that, when executing on computing hardware, cause the computing hardware to implement: a verifier engine to verify the integrity of the software image, a security monitor engine to set an initial access state for the software image granting access to the verifier engine and to update the access state for the software image in accordance with at least one security policy, and an installer engine to install software contained in the software image according to the access state.

20 Claims, 6 Drawing Sheets

(56) References Cited

U.S. PATENT DOCUMENTS

| | | | |
|---|---|---|---|
| 7,660,977 B2* | 2/2010 | Zimmer | G06F 8/65 |
| | | | 713/1 |
| 7,681,226 B2 | 3/2010 | Kraemer et al. | |
| 8,200,988 B2* | 6/2012 | Gass | G06F 21/572 |
| | | | 713/193 |
| 8,424,088 B1 | 4/2013 | Kowalyshyn | |
| 8,826,005 B1 | 9/2014 | Brichford | |
| 9,032,318 B2 | 5/2015 | Louch et al. | |
| 9,098,706 B1 | 8/2015 | Kennedy | |
| 9,118,666 B2 | 8/2015 | Naguib | |
| 9,390,278 B2* | 7/2016 | Scouller | G06F 12/1466 |
| 9,747,096 B2 | 8/2017 | Searle et al. | |
| 9,824,194 B2 | 11/2017 | Balasubramanian | |
| 10,225,426 B2 | 3/2019 | Yasukawa | |
| 10,452,381 B2* | 10/2019 | Khakpour | H04L 69/14 |
| 10,476,894 B2 | 11/2019 | Todorovic | |
| 10,735,184 B2 | 8/2020 | Nenov et al. | |
| 11,036,836 B2 | 6/2021 | Touboul et al. | |
| 2003/0037246 A1* | 2/2003 | Goodman | G06F 21/572 |
| | | | 713/191 |
| 2005/0132357 A1 | 6/2005 | Shell et al. | |
| 2006/0143600 A1* | 6/2006 | Cottrell | G06F 21/572 |
| | | | 717/168 |
| 2009/0100519 A1 | 4/2009 | Tarbotton et al. | |
| 2009/0150662 A1* | 6/2009 | Desselle | G06F 8/65 |
| | | | 713/100 |
| 2012/0072734 A1* | 3/2012 | Wishman | G06F 21/60 |
| | | | 713/189 |
| 2014/0004825 A1* | 1/2014 | Prakash | G06F 21/57 |
| | | | 455/411 |
| 2015/0363575 A1 | 12/2015 | Vlot | |
| 2018/0089435 A1* | 3/2018 | Zander | G06F 21/577 |
| 2018/0114024 A1* | 4/2018 | Dasari | G06F 21/572 |
| 2019/0042752 A1* | 2/2019 | Mihm | G06F 21/575 |
| 2020/0004966 A1 | 1/2020 | Mohinder et al. | |
| 2020/0012488 A1* | 1/2020 | Koval | G06F 9/4401 |
| 2020/0143057 A1* | 5/2020 | Limonciello | G06F 21/57 |
| 2020/0159512 A1 | 5/2020 | Schutt | |
| 2020/0174779 A1* | 6/2020 | David | G06F 8/654 |
| 2020/0259827 A1 | 8/2020 | Shaffer et al. | |
| 2020/0293662 A1 | 9/2020 | Gupta | |
| 2020/0387365 A1 | 12/2020 | Arif | |
| 2022/0019669 A1* | 1/2022 | Morita | G06F 8/656 |
| 2022/0067162 A1* | 3/2022 | Jeansonne | G06F 21/572 |

FOREIGN PATENT DOCUMENTS

| | | |
|---|---|---|
| RU | 2495487 C1 | 10/2013 |
| RU | 2696951 C1 | 8/2019 |

OTHER PUBLICATIONS

Russian Office Action corresponding to Application No. 2021113657 dated Apr. 18, 2022.
European Search Report corresponding to EP 21213952 dated May 10, 2022.

* cited by examiner

SYSTEMS AND METHODS FOR VERIFYING THE INTEGRITY OF A SOFTWARE INSTALLATION IMAGE

CROSS-REFERENCE TO RELATED APPLICATION

The present application claims priority to Russian Application No. RU 2021113657, filed May 13, 2021, which is hereby fully incorporated herein by reference.

TECHNICAL FIELD

The present disclosure relates to information security, and more specifically to software installation security.

BACKGROUND

Currently, user computing devices have a large amount of software installed, each of which is configured to perform various functions. Software developers constantly work on correcting errors and improving software functionality. For this reason, new software or updates for existing software are often installed on user computer devices. A software installation methods can include delivering a file containing a software installation image to the computer, verifying the software installation image's authenticity, and subsequently installing the software from the software image file.

However, components of software installers involved in the software installation process are vulnerable to various computer attacks and to errors in software. For example, a verification component responsible for verifying the authenticity of a software image may skip the verification if it was not invoked by a component controlling the update process. And if the verification has been completed, its result may be ignored by a component responsible for the installation of the software from the software image. Therefore, if the result of a verification shows that the software image is not authentic, the software will still be installed from a non-authentic software image. This means that, even if the verification component is considered to be a trusted component, vulnerabilities in other non-trusted components can affect the installation process.

Another problem arises from the fact that the content of a software image can be modified after the software image's authenticity has been verified, but before the software image is read by the component responsible for software installation. The aforementioned situations can occur for various reasons. For example, such situations can occur due to a software error in one or multiple components that perform the software installations process, or due to exploitation of vulnerabilities of such components by malicious software, or due to a critical error in the operating system (OS), or due to erroneous reading from or writing to the software image by an outside application.

Therefore, a technical problem exists in the vulnerability of non-trusted components involved in the software installation process.

Traditional systems that perform installation and updates of software on a computer include U.S. Pat. No. 10,735,184, which describes a software updating system that uses blockchain technology to perform independent verification of the software update's outcome. In another example, U.S. Pat. No. 10,225,426 describes methods for updating software by verifying and updating software using a verified update program.

However, known technologies do not solve the technical problem in question. Specifically, if the components involved in the software installation process have vulnerabilities, the software installation will be performed incorrectly and unsafely. Therefore, there is a need to further ensure the software installation process.

SUMMARY

Embodiments described herein meet the aforementioned needs of the industry. In particular, disclosed herein are systems and methods for verifying the integrity of a software installation image before installing the software. The technical result ensures the security of the software installation process by providing access to the software image from a security monitor using security policies.

In an embodiment, an installation system for protecting the installation of a software image comprises: computing hardware of at least one processor and a memory operably coupled to the at least one processor; and instructions that, when executing on the computing hardware, cause the computing hardware to implement: a security monitor engine configured to set an initial access state for the software image granting access to a verifier engine and to update the access state for the software image in accordance with at least one security policy, the verifier engine configured to verify the integrity of the software image, and an installer engine configured to install software contained in the software image according to the access state.

In an embodiment, a method for protecting the installation of a software image comprises: setting an initial access state for the software image granting access to a verifier engine and to update the access state for the software image in accordance with at least one security policy; verifying, with the verifier engine, the integrity of the software image; and installing, with an installer engine, software contained in the software image according to the access state.

In an embodiment, a system for protecting the installation of a software image comprises computing hardware of at least one processor and a memory operably coupled to the at least one processor; and instructions that, when executing on the computing hardware, cause the computing hardware to implement: a security monitor engine configured to: set a verifier integrity level for a verifier engine and an installer integrity level for an installer engine higher than a software image integrity level for the software image, wherein the verifier engine is configured to verify the integrity of the software image and the installer engine is configured to install software contained in the software image, set a verifier access level for the verifier engine equal to the software image integrity level, set an installer engine access level equal to the installer integrity level, and set at least one security policy to allow components of the verifier engine or the installer engine access to another component when the respective access level of a first component does not exceed the respective integrity level of a second component, wherein when the verifier engine successfully verifies the integrity of the software image, the security monitor engine is further configured to change the software image integrity level to be equal to the installer engine access level.

In an embodiment, a method is used for verifying the integrity of a software installation image before installing the software, where: a security monitor is used to set a value of the software installation image's state (hereinafter referred to as "the software image") indicating that access to the software image is granted only to a verifier; also, the software image's state is a parameter used by security policies to grant or deny components access to the software image; the components include a verifier and an installer; a security monitor is used to grant access to the software image by request from the verifier, if the security policies are met; the verifier is used to verify the software image's integrity in accordance with the granted access; if it is found that the software image's integrity is not compromised, the security monitor is used to change the value of the software image's state to a new one, indicating that the installer is granted access to the software image and that the verifier is denied access to the software image; the security monitor is used to grant access to the software image by request from the installer, if the security policies are met.

In an embodiment, the security policies can use a finite state machine; the finite state machine's state is the software image's state. In an embodiment, the security policy determines the granting or the denial of access to the software image, depending on the finite state machine's state and in accordance with the finite state machine's state transition table.

In an embodiment, the security policies can use temporal logic.

In an embodiment, the software image includes one or more of multiple objects, from among the following: a software item; a software update; or an embedded software image.

In an embodiment, the software image's integrity is checked by verifying the integrity of the objects contained in the software image; in this case, the software image's integrity is considered not compromised if the integrity of at least one object contained in the software image is not compromised.

In an embodiment, the installer is used to install the software contained in the software image.

In an embodiment, the installer is used to install only the software whose integrity is not compromised.

In an embodiment, the software image's integrity is verified using at least one of the following methods: by verifying the digital signature of the software image; by obtaining a confirmation from the user; by using a message authentication code; by whether the user role matches preset requirements; or by verifying the preset attributes of the software image.

In an embodiment, the software installation image is downloaded from a remote resource using a downloader.

In an embodiment, access can include read access including the reading of data.

In an embodiment, a method is used for verifying the integrity of a software installation image before installing the software, where: a security monitor is used to set the following: the integrity level values for the verifier and the installer ("the components") to be higher than the value of the software image's integrity level; the verifier's access value to be equal to the software image integrity value; the installer's access level value to be equal to the installer's integrity level value; security policies permitting access by one component to another component, on the condition that the access level value of one component is not higher than the integrity level value of the other component; using a security monitor, access is granted to the software image by request from the verifier, on the condition that the security policies are met; the verifier is used to verify the software image's integrity in accordance with the granted access; if it is found that the software image's integrity is not compromised, the security monitor is used to change the software image's integrity level value to a value equal to the installer's access level value; the security monitor is used to grant access to the software image by request from the installer if the security policies are met.

In an embodiment, a system is used for verifying the integrity of a software installation image before installing the software, which contains the following: a security monitor configured for granting or denying the following components access to the software image in accordance with security policies: a verifier and an installer; the verifier is configured for checking the software image's integrity in accordance with the granted access; the installer is configured to install the software contained in the software image.

In an embodiment, the security monitor is additionally configured for the following: setting the software image's state value to indicate that only the verifier is granted access to the software image; in this case, the software image's state is a parameter used by the security policies to grant or deny the above-mentioned components access to the software image; changing the software image's state value to a new one, indicating that the installer is granted access to the software image and that the verifier is denied access to the software image.

In an embodiment, the security policies can use a finite state machine, where the state of the finite state machine is the state of the software image; in this case, the security policy determines the granting or the denial of access to the software image depending on the finite state machine's state and in accordance with the finite state machine's state transition table.

In an embodiment, the security policies can use temporal logic.

In an embodiment, the security monitor is additionally configured for: setting the verifier's and the installer's integrity level values to be higher than the software image's integrity level value; setting the verifier's access level value to be equal to the software image's integrity level value; setting the installer's access level value to be equal to the installer's integrity level value; setting the security policies granting one component access to another component, provided that the access level value of one component is not higher than the integrity level value of the other component, where the above-mentioned access includes reading of data; changing the software image's integrity level value to a value equal to the installer's access level value, on the condition that the software image's integrity is not compromised.

In an embodiment, the aforementioned access to the software image includes reading of the software image.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Glossary

Process: a sequence of operations during execution of a program or part thereof together with the data being used. A process can include one or more threads and the system resources associated therein.

Inter-process communication (IPC): a set of methods for data exchange between multiple threads in one or more processes. Processes may be launched on one or more computers connected by a network. IPC methods are divided into methods for exchanging messages, synchronization, shared memory and remote calls.

Asynchronous process: a process where an operation does not require a response in order to continue execution.

Synchronous process: a process where an operation requires a response in order to continue execution.

Operation: an elementary action executed within a process. An operation can be, for example, represented by an API function.

For example, current operating systems, when exchanging data between two processes using inter-process communication methods, can use both synchronous and asynchronous operations.

Data integrity: consistency, completeness, and security of data. For example, integrity of data stored in a database means that the data contained in it must be fully consistent and must contain all information needed to perform the functions assigned to the database. Accidental destruction (deletion) or distortion must be precluded. Data integrity is typically ensured by a database management system.

Finite State Machine: a model of a discrete device characterized by states and transitions from one state to another. Each state of a finite state machine characterizes one of the possible situations in which the finite state machine can exist.

Figure 1:
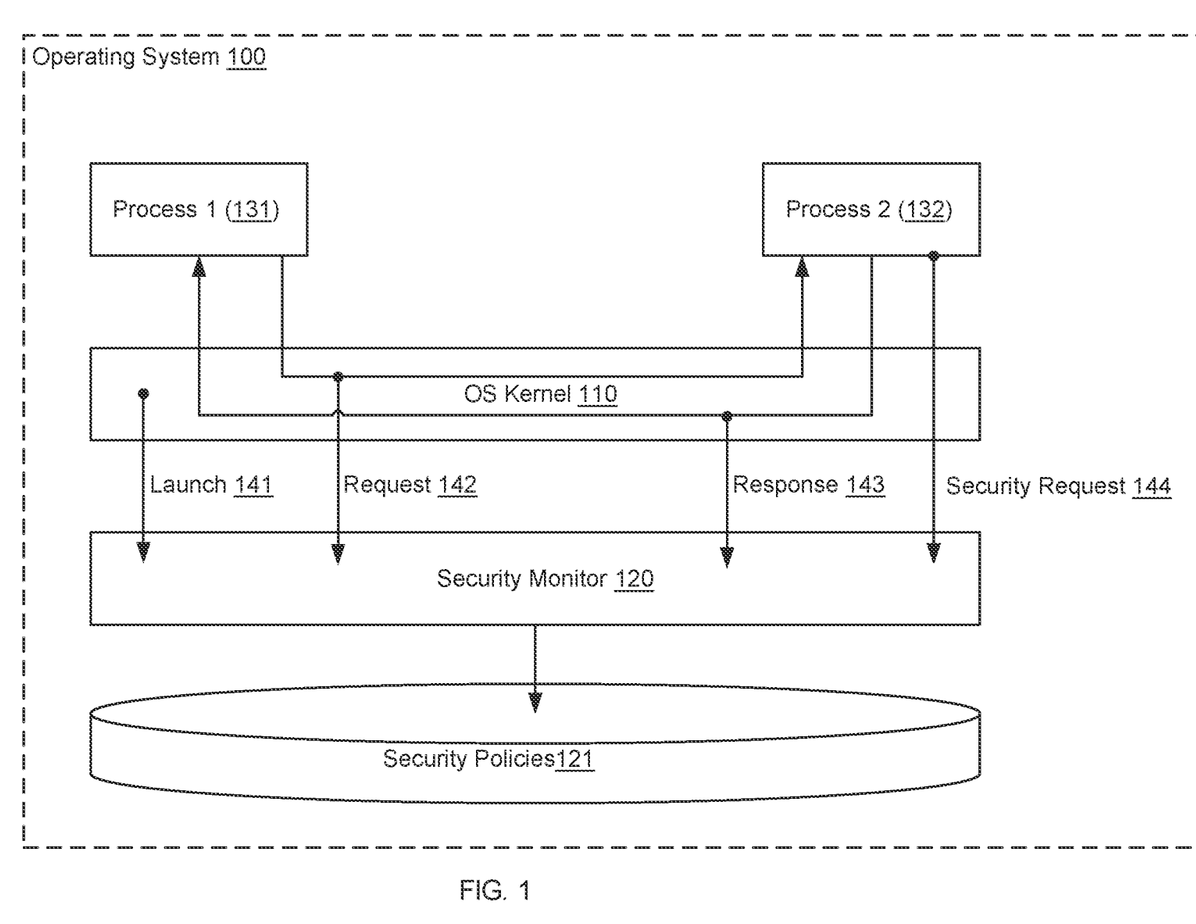
FIG. 1 is a block diagram of example inter-process communication using an operating system with a microkernel architecture, according to an embodiment.

Referring to FIG. 1, a block diagram of example inter-process communication using an operating system with a microkernel architecture is depicted, according to an embodiment. More particularly, inter-process communication is depicted using an operating system (OS) 100. The OS 100 includes isolated processes 131-132, which communicate with each other and with the kernel of the OS 110 through software interfaces by exchanging messages. A security monitor (also, reference monitor) 120 can be a component of the OS 100 configured to monitor communications, also called OS events, which include: a launch 141 of a process 131; a request 142 from the process 131, or a response 143 from another process 132; or a communication from the process 132 to the security monitor 120 (a security request 144). Using the security monitor 120, each OS event is analyzed for compliance with security policies 121. Depending of the results of the analysis, the OS event's execution is granted or denied. In this case, the security monitor 120 can be a part of the kernel of the OS 110 or a separate application. The security monitor 120 can be executed in a privileged mode of the kernel of the OS 110.

Figure 2:
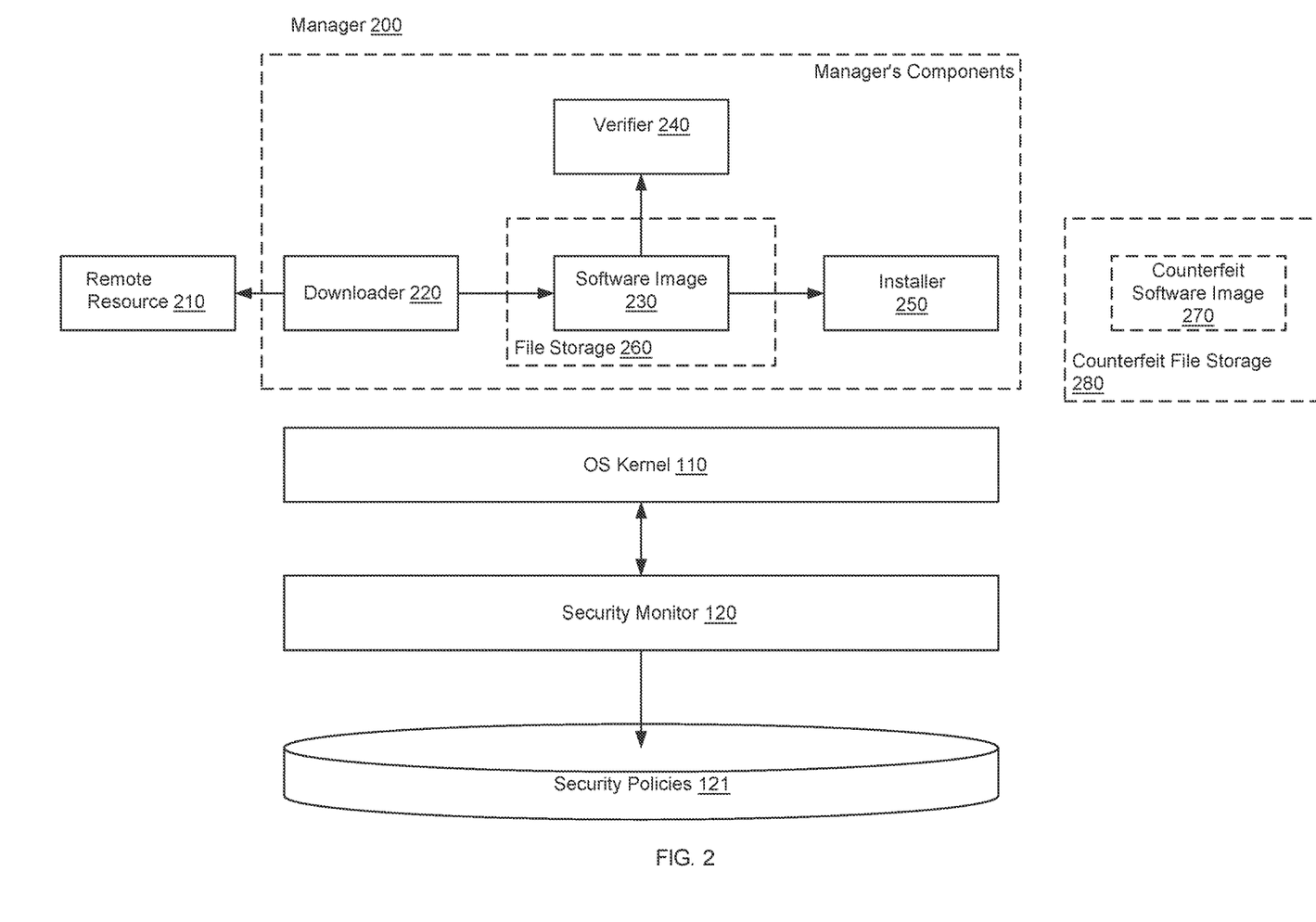
FIG. 2 is a block diagram of a system for verifying the integrity of a software installation image, according to an embodiment.

Referring to FIG. 2, a block diagram of a system for verifying the integrity of a software installation image is depicted, according to an embodiment. More particularly, FIG. 2 illustrates a system for verifying the integrity of a software installation image 230 on a computer with an OS 100 whose example architecture was depicted in FIG. 1.

The process of installing software from the software installation image 230 is performed including using an installation system manager 200. The software installation image 230 (or "the software image") can be a file which is located in the read-only memory or the random access memory of a computer and includes at least one of the following objects: a software item; a software update; or an embedded software image. In embodiments, the software image 230 can include a combination of the aforementioned objects—for example, one software item and one embedded software image, which, in turn, can include, for example, another software item.

In an embodiment, the software image 230 can use any kind of software storage implementation, as will be appreciated by one of ordinary skill in the art. The software image 230 can be, for example, an archive or an installation package. An installation package is an archived file which can include software files, control files, and, optionally, software installation setup files. The aforementioned files can be provided in source code, in intermediate code, or in executable code.

The system 200 can include a verifier 240 and an installer 250. The software image 230 can be delivered to a computer using various methods. For example, the software image 230 can be previously saved to the computer during the installation of the OS 100. Additionally, the software image 230 can be downloaded, using a downloader 220, from a remote resource 210 and saved to the computer. It should be noted that all communications between the tools of the system 200 are made using system calls of the kernel of the OS 110 and are monitored by the security monitor 120. In embodiment, the software image 230 is stored in a file storage 260, which is also a component of the installation system 200. In this case, the communication of the downloader 220, the verifier 240 and the installer 250 with the software image 230 can be made using communication with the file storage 260.

Since the technical problem includes the vulnerability of non-trusted components involved in the software installation process, possible vulnerabilities in the components of an installation system 200 are discussed below. The most vulnerable, and therefore, non-trusted component is the one most difficult to implement, i.e. the installation system 200 and, in particular, a component of the system 200 (not shown in the figure) which controls the software installation process. The downloader 220 can also be a non-trusted and vulnerable component—in particular, due to communication with an outside network. The verifier 240 and the installer 250 are trusted components. Specifically, the verifier 240 and the installer 250 are specialized components and which allow confirmation of correct functioning. This is the exact reason why a need arises for a security monitor 120, which uses security policies to verify the integrity of the software installation image 230 after the software installation image 230 is downloaded by a non-trusted component (the downloader 220) and before the software is installed from the software image 230 by a trusted component (the installer 250). Embodiments therefore achieve the claimed technical result.

The security monitor 120 is configured for granting or denying components of the installation system 200 access to the software image 230 in accordance with security policies 121. In this case, access to the software image 230 is an inter-process communication and includes reading the software image 230. The verifier 240 is configured for verifying the integrity of the software image 230 as per the granted access. Integrity of the software image 230 means invariability of the data of the software image 230 during installation of the software image. Therefore, if, at one of the software installation phases, the software image 230 file was modified or replaced, its integrity is considered to be compromised.

The installer 250 is configured for installing the software contained in the software image 230. The software installation itself can be made by a number of methods, as one will be appreciated by one of skill in the art. For example, by extracting from the software image 230 all files related to the software being installed, then saving the above-mentioned files to the file system of a computer, and creating and modifying configuration files for correct operation of the software being installed.

In one embodiment, the integrity of the software image 230 is considered not to be compromised if the integrity of at least one object contained in the software image 230 is not compromised. For example, if a software image 230 contains two software items, and the data of the software image 230 file related to the first software item was modified, while the data related to the second software item was not modified, the integrity of such software image 230 will be considered not compromised. In this embodiment, the installer 250 is used to install only the software item whose integrity is not compromised, i.e. only the second software item. In this manner, the above-mentioned embodiment ensures the installation of software from the software image 230 whose integrity is not compromised. At the same time, the system 200 blocks the installation of software from the software image 230 whose integrity was compromised, thus ensuring the security of the OS 100 and of the computer.

In one embodiment, the verifier 240 is used to verify the integrity of the software image 230 using at least one of the following methods: by checking the digital signature of the software image 230, or by verifying the digital signatures of objects contained in the software image 230; by obtaining a confirmation from the user; by using a message authentication code; by checking whether a user role meets preset requirements (for example, the device from which the user authorization is performed must have preset characteristics, location or authorization data); or by verifying preset attributes of the software image 230.

In another embodiment, the verifier 240 is used to verify the integrity of the software image 230 using a combination of two or more approaches, in particular, those described above. In yet another embodiment, various patterns for using such approaches are set during the verification; for example, using two or more approaches selectively, using at least the preset number of approaches, using the preset number of approaches, etc.

Security policies 121 can include preset rules which grant or deny a component (for example, the verifier 240) access to another component (for example, the software image 230 of the system 200) when a condition of the relevant security policy 121 is met.

In an embodiment, the security monitor 120 is additionally configured for setting a value of the state of the software image 230 indicating that access to the software image 230 is granted only to the verifier 240. The state of the software image 230 is a parameter used by security policies 121 to grant or deny components of the system 200 access to the software image 230. In addition, the security monitor 120 is configured for changing the value of the state of the software image 230 to a new one, indicating that access to the software image 230 is granted to the installer 250 and that access to the software image 230 is denied to the verifier 240. For example, "state 1" of the software image 230 indicates that access to the software image 230 is granted only to the verifier 240; "state 2" indicates that access to the software image 230 is granted to the installer 250 and that access to the software image 230 is denied to the verifier 240, etc.

In yet another embodiment, the security policies 121 involve using a finite state machine, where the finite state machine's state is the state of the software image 230. In this case, the security policy 121 determines the granting or the denial of access to the software image 230, depending on the finite state machine's state and in accordance with the finite state machine's state transition table. A possible example of implementation of security policies 121 using a finite state machine is provided further with respect to FIG. 5.

In yet another embodiment, the security policies 121 are implemented using a mandatory integrity control model. A mandatory integrity control model provides a mechanism for monitoring access to the objects being protected, which, in the instant disclosure, are components of the system 200. As per a mandatory access control model using a security monitor 120, components of the system 200 are associated with two numbers, called integrity level and access level. In this case, the monitoring of access of one component (access subject) to another component (access object) uses security policies 121 based on mandatory access control, i.e. security policies that use integrity level and access level values of the components. For example, a security policy 121 can be used which grants one component reading access to another component if the first component's integrity level value is not lower than the other component's integrity level value, or, if this condition is not met, then if the first component's access level value is not higher than the other component's integrity level value. A distinction should be made between the term "integrity of software image 230", which means invariability of data of the software image 230, and the terms "integrity level" and "access level", where the integrity level and access level values are used by the security policies 121 and by the security monitor 120 to determine granting or denial of access to the software image 230 in accordance with the above-mentioned security policies 121.

In the embodiment being discussed, the security monitor 120 is additionally configured for setting integrity level values of the verifier 240 and of the installer 250 higher than the integrity level value of the software image 230. The security monitor 120 is also configured for setting the access level value of the verifier 240 to be equal to the integrity level value of the software image 230 and the access level value of the installer 250 to be equal to the integrity level value of the installer 250. It should be noted that the software image 230 is a passive component (access object), which itself does not request access to other components but can be accessed by other components. For this reason, the software image 230 has only an integrity level but does not have an access level. The security monitor 120 is also configured for installing the security policies 121 granting one component access to another component, on the condition that the access level value of one component is not higher than the integrity level value of the other component. Also, in this embodiment, the security monitor 120 is used to change the value of the integrity level of the software image 230 to a value equal to the access level value of the installer 250, on the condition that the integrity of the software image 230 is not compromised.

In yet another embodiment, the security policies 121 use temporal logic. The use of temporal logic will be discussed below in more detail.

Figure 3:
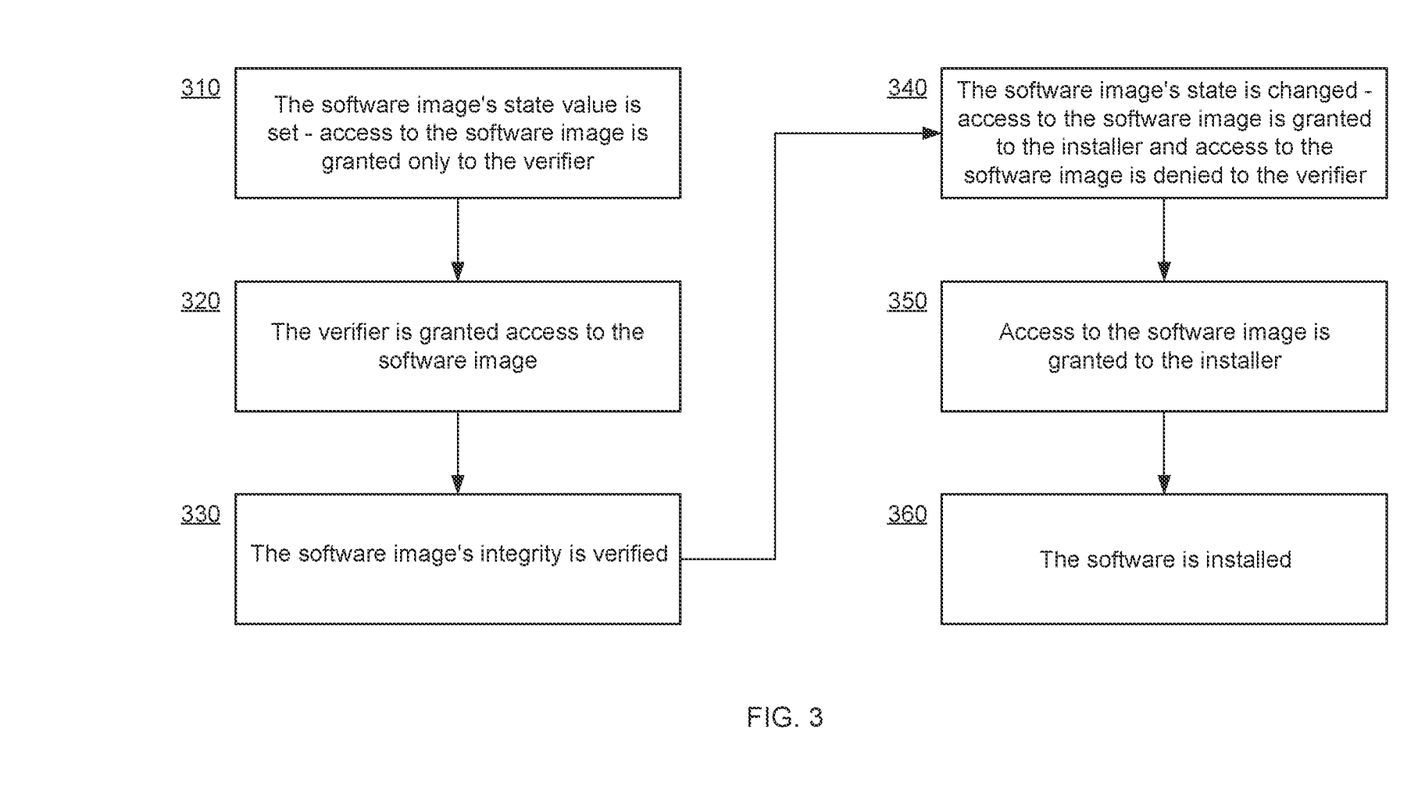
FIG. 3 is a flowchart of a method for verifying the integrity of a software installation image prior to software image installation, according to an embodiment.

Referring to FIG. 3, a flowchart of a method for verifying the integrity of a software installation image prior to software image installation is depicted, according to an embodiment. More particularly, FIG. 3 illustrates an option of the method for verifying the integrity of a software installation image 230 before the software's installation.

At 310, the security monitor 120 is used to set a value of the state of the software image 230 indicating that access to the software image 230 is granted only to the verifier 240. Then, at 320, the security monitor 120 is used to grant access to the software image 230 by request from the verifier 240, on the condition that the security policies 121 are met. At 330, the verifier 240 is used to verify the integrity of the software image 230 as per the granted access. If it is found that the integrity of the software image 230 is not compromised, at 340 the security monitor 120 is used to change the value of the state of the software image 230 to a new one, indicating that access to the software image 230 is granted to the installer 250 and that access to the software image 230 is denied to the verifier 240. At 350, the security monitor 120 is used to grant access to the software image 230 by request from the installer 250, if the security policies 121 are met. After that, at 360, the installer 250 is used to install the software contained in the software image 230.

In this manner, at each step, the security monitor 120, using the security policies 121, ensures monitoring of the process of installing the software from the software image 230. Therefore, even in the case of vulnerabilities of individual components of the system 200, security of the software installation process will be ensured. In particular, Steps 310-320 ensure that access to the software image 230 is granted only to the verifier 240, which, at 330, verifies the integrity of the software image 230. As a result, 340-350 guarantee that only the installer 250 is granted access to the software image 230, the integrity of which is not compromised, based on the results of the verification by the verifier 240. Accordingly, if the result of the verification at 330 indicates that the integrity of the software image 230 is compromised, the result of such verification will not be ignored by the installer 250, and the software contained in the software image 230 will not be installed. In addition, the software image 230 cannot be substituted after confirmation of its integrity at 330, but before the installer 250 reads the software image 230 at 350. This is ensured by the fact that, at 340, the security monitor 120 is used to change the value of the state of the software image 230 to a new one, indicating that access to the software image 230 is granted to the installer 250 and that access to the software image 230 is denied to the verifier 240. Consequently, the disclosure presented in FIGS. 1-3 solves the claimed technical problem and achieves the claimed technical result.

Embodiments of the system for verifying the integrity of a software image 230, disclosed in the description of FIGS. 1-2, can also apply to the method described in FIG. 3.

Figure 4:
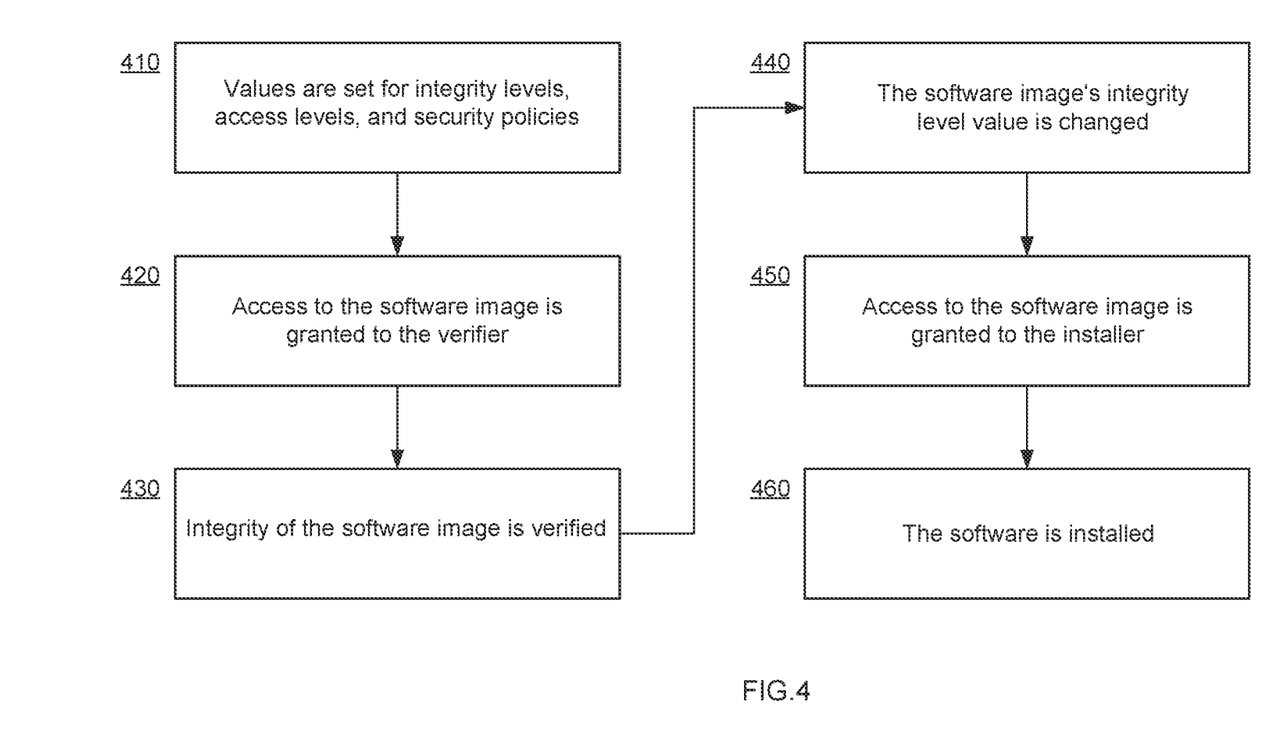
FIG. 4 is a flowchart of another method for verifying the integrity of a software installation image prior to software image installation, according to an embodiment.

Referring to FIG. 4, a flowchart of another method for verifying the integrity of a software installation image prior to software image installation is depicted, according to an embodiment. More particularly, FIG. 4 illustrates another option of a method for verifying the integrity of a software installation image 230 before the software's installation.

At 410, the security monitor 120 is used to set the following:
 the integrity level values of the verifier 240 and of the installer 250 are set to be higher than the integrity level value of the software image 230 (hereinafter referred to as "the components");
 the access level value of the verifier 240 is set to be equal to the integrity level value of the software image 230;
 the access level value of the installer 250 is set to be equal to the integrity level value of the installer 250;
 the security policies 121 are set to grant one component access to another component on the condition that the access level value of one component does not exceed the integrity level value of the other component. In an embodiment, the aforementioned access includes reading of data.

At 420, the security monitor 120 is used to grant access to the software image 230 by request from the verifier 240, on the condition that the security policies 121 are met. Then, at 430, the verifier 240 is used to verify the integrity of the software image 230 as per the granted access. If it is found that the integrity of the software image 230 is not compromised, then, at 440, the security monitor 120 is used to change the integrity level value of the software image 230 to a value equal to the access level value of the installer 250. At 450, the security monitor 120 is used to grant access to the software image 230 by request from the installer 250, if the security policies 121 are met. After that, at 460, the installer 250 is used to install the software contained in the software image 230.

In this manner, at each step, the security monitor 120, using the security policies 121, ensures monitoring of the process of installing the software from the software image 230. Therefore, even in the case of vulnerabilities of individual components of the system 200, security of the software installation process will be ensured. In particular, Steps 410-420 ensure that access to the software image 230 is granted only to the verifier 240, which, at 430, verifies the integrity of the software image 230. As a result, Steps 440-450 guarantee that only the installer 250 will be granted access to the software image 230, the integrity of which is not compromised, based on the results of the verification by the verifier 240. Accordingly, if the result of the verification at 430 showed that the integrity of the software image 230 is compromised, the result of such verification will not be ignored by the installer 250, and the software contained in the software image 230 will not be installed. In addition, the software image 230 cannot be substituted after confirmation of its integrity at 430, but before the installer 250 reads the software image 230 at 450. This is ensured by the fact that, at 440, the security monitor 120 is used to change the integrity level value of the software image 230 to a value equal to the access level value of the installer 250. Consequently, the disclosure presented in FIGS. 1-4 solves the claimed technical problem and achieves the claimed technical result. The individual system embodiments presented in the description of FIGS. 1-2 are also applicable to the methods presented in the description of FIGS. 3-4.

In an example of implementation of the security policies 121 using a mandatory integrity control model (as per the method in FIG. 4), the integrity level and the access level of the components of the system 200 can acquire one of the three values: low, medium, or high.

The security policies 121 can be set using a specification language, for example, PSL (policy specification language). In the PSL example, the mandatory integrity control is set by the mandatory_integrity_control policy class. The security policy class determines a set of rules corresponding to the rules of the model used in the security policy. For example, the aforementioned model can be one of the following: a finite state machine; mandatory integrity control; or temporal logic. The specification of the security policy determines the match between the aforementioned rules and the communications in the system. At each communication attempt, the security monitor 120 executes the rules in order to determine the decision whether the communication is allowable. In order to use a policy class, a policy object is created on the basis of the policy class, and a configuration is specified for the object. For example, for a mandatory integrity control model, integrity levels and access levels are set. In this manner, in order to set integrity levels, an integrity policy object is determined, which is an item of the mandatory_integrity_control class:

```
policy object integrity =
    mandatory_integrity_control {
        levels : ["LOW", "MEDIUM", "HIGH"]
    }
```

In the configuration of the "integrity" policy object, three integrity levels are set: LOW, MEDIUM, and HIGH, in ascending order (i.e., LOW<MEDIUM<HIGH).

Then, a security policy 121 is set in order to create processes implementing the components of the system 200:

```
execute method=exec, dst=Downloader {
    integrity.execute {
        target : dst,
        image : message.image,
        level : "LOW" }
},
``` where "level" means the integrity level.

The "execute" directive is specified for assigning rules to be executed by the security monitor 120 when the relevant processes are created, and also for the OS kernel 110 to provide the necessary context to the security monitor 120 (the "exec" method of the "execute" interface). Message-.image specifies the image of the file from which the component of the system 200 is created. In addition, the identifier (ID) of the process which communicated with the kernel of the OS 110 to create a new dst process is provided.

In accordance with the aforementioned security policy, the security monitor 120 is used to set a LOW integrity level value for the downloader 220. In an embodiment, since the access level value of the downloader 220 is not set, it is considered to be equal to the set integrity level value of the downloader 220, i.e. LOW. Therefore, after the software image 230 is downloaded, the software image 230 will also be assigned a LOW integrity level value, equal to the integrity level value of the downloader 220 which downloaded it.

```
execute method=exec, dst=Verifier {
    integrity.execute {
        target : dst,
        image : message.image,
        level : "HIGH", levelA: "LOW" }
},
``` where levelA means the access level.

In accordance with this security policy, the security monitor 120 is used to assign the verifier 240 a HIGH integrity level value and a LOW access level value.

```
execute method=exec, dst=Installer {
    integrity.execute {
        target : dst,
        image : message.image,
        level : "HIGH" }
}
```

In accordance with this security policy, the security monitor 120 is used to assign the installer 250 a HIGH integrity level value. Since the access level value of the installer 250 is not set, it is considered to be equal to the set integrity level value, i.e. HIGH.

```
execute method=exec, dst=FileSystem {
    integrity.execute {
        target : dst,
        image : message.image,
        level : "HIGH" }
}
```

In accordance with this security policy, the security monitor 120 is used to assign the file storage (FileSystem) 260, if it is present in the installation system 200, a HIGH integrity level value. Since the access level value of the file storage 260 is not set, it is considered to be equal to the set integrity level value, i.e. HIGH.

In this manner, as per the provided example, at 410 the security monitor 120 is used to set integrity level values and values of the security policies 121. As per the aforementioned security policies 121, the downloaded software image 230 has a LOW integrity level. At 420, the security monitor 120 is used to grant the verifier 240 access to the software image 230, because the access level value of the verifier 240 is LOW, which coincides with the integrity level value of the software image 230. In this manner, at 430, the verifier 240 is used to verify the integrity of the software image 230 as per the granted access. After that, if the integrity of the software image 230 is not compromised, at 440 the security monitor 120 is used to change the integrity level value of the software image 230 to a value equal to the access level value of the installer 250, i.e. to a HIGH value. Then, at 450, the security monitor 120 is used to grant access to the software image 230 by request from the installer 250 if the security policies 121 are met, i.e. if the access level of the installer 250 is not higher than the integrity level of the software image 230. In this case they will coincide, acquiring a HIGH value. Consequently, at 460, the installer 250 will be used to install the software contained in the software image 230.

It should be noted that, if a counterfeit file storage 280 with a MEDIUM integrity level existed, then, using the methods (services) of such counterfeit file storage 280, the downloader 220 would write a counterfeit software image 270 to the counterfeit file storage 280 with a LOW integrity level. Such counterfeit software image 270 will be checked for integrity by the verifier 240. Although the integrity level of the counterfeit software image 270 will be increased to a maximum allowable value, this value will not exceed the integrity level value of the counterfeit file storage 280, i.e. MEDIUM<HIGH values. As a result, the installer 250 will not gain access to the counterfeit software image 270 and will not install the software from the counterfeit software image 270, because the integrity level value of the counterfeit software image 270 will be equal to MEDIUM<HIGH.

In this example of the security policies 121, it is therefore shown how the disclosure solves the technical problem in the case of vulnerability of non-trusted components involved in the software installation process. It also follows that the instant disclosure achieves the described technical result; ensuring the security of the software installation process by providing access to the software image from a security monitor using security policies.

Figure 5:
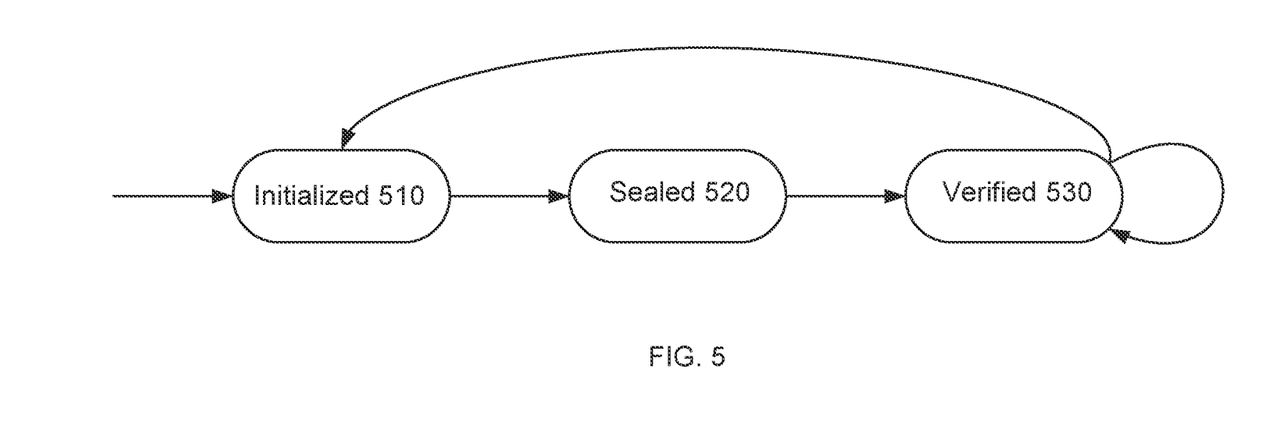
FIG. 5 is a block diagram of a finite state machine for implementing security policies, according to an embodiment.

In an embodiment, an example of implementation of the security policies 121 using a finite state machine is described further with respect to FIG. 5. Referring to FIG. 5, a block diagram of a finite state machine for implementing security policies is depicted, according to an embodiment. More particularly, FIG. 5 depicts a diagram of a finite state machine for the security policies 121 embodiment utilizing a finite state machine. It should be noted that either one (global) finite state machine or multiple finite state machines can be used, which are different for each specific software image 230, in case if the system 200 has more than one software image 230. If multiple finite state machines are used, each finite state machine is additionally provided with the ID of the software image 230 corresponding to them.

Provided below is the description of an install_checker finite state machine:

```
policy object install_checker = finite_state_machine {
  states : [Initialized, Sealed, Verified],
  initial : Initialized,
  transitions : {
    Initialized: [Sealed],
    Sealed : [Verified],
    Verified : [Verified, Initialized]
  }
}
```

The install_checker finite state machine can be in one of the following states: initialized 510, sealed 520, or verified 530. A transition table of the install_checker finite state machine is provided in the "transitions" structure. During initialization of the install_checker finite state machine, the finite state machine is in the "initialized" state 510. From the "initialized" state 510, the finite state machine can transition only to the "sealed" state 520, which corresponds to the state of the software image 230 indicating that access to the software image 230 is granted only to the verifier 240.

From the "sealed" state 520, the finite state machine can transition only to the "verified" state 530, which corresponds to the state of the software image 230 indicating that access to the software image 230 is granted to the installer 250 and that access to the software image is denied to the verifier 240. From the "verified" state 530, the install_checker finite state machine can transition to the same "verified" state 530 or to the "initialized" state 510.

Presented below are examples of security policies 121 using the install_checker finite state machine.

```
request src=Manager,
    dst=Installer,
    method=Install {
        install_checker.allow [Verified];
    }
```

As per this security policy, the installation system (Manager) 200 is allowed a request 142 to the "install" method of the installer 250 on the condition that the install_checker finite state machine is in the "verified" state 530. In this case, the "install" method installs the software from the software image 230.

```
security src=Verifier, method=Confirm {
    install_checker.enter Verified;
}
```

As per this security policy, the verifier 240 is allowed to make a security request 144 to change the state (the "confirm" method) of the install_checker finite state machine to the "verified" state. In this case, a change of the finite state machine state will be made by the security monitor 120 if the change of the finite state machine state matches the transitions table of the finite state machine.

```
request src=Manager,
    dst= Storage,
    method=Write {
        install_checker.allow [Initialized];
    }
```

As per this security policy, the Manager 200 is allowed a request 142 to the "write" method of the file storage for writing the software image 230 on the condition that the install_checker finite state machine is in the "initialized" state. In this case, the downloader 220 will begin the process of writing the software image 230.

```
request src=Manager,
    dst=Storage,
    method=Commit {
        install_checker.enter Sealed;
    }
```

As per this security policy, the Manager 200 is allowed a request 142 for calling the "commit" method (e.g. confirmation of completion of writing of the software image 230) of the file storage. In this case, the state of the install_checker finite state machine will be changed from "initialized" to "sealed".

```
request src=Verifier,
    dst=Storage,
    method=Read {
        install_checker.allow [Sealed];
    }
```

As per this security policy, the verifier 240 is allowed a request 142 to the file storage for the "read" method, i.e. is granted reading access to the software image 230 on the condition that the install_checker finite state machine is in the sealed state 520.

```
request src=Installer,
    dst=Storage,
        method=Read {
            install_checker.allow [Verified];
        }
```

As per this security policy, the installer 250 is allowed a request 142 to the file storage for the "read" method, i.e. is granted reading access to the software image 230 on the condition that the install_checker finite state machine is in the verified state 530.

Accordingly the example security policies 121 illustrate how the instant disclosure solves the technical problem in the case of vulnerability of non-trusted components involved in the process of software installation. It also follows that the disclosure achieves the described technical result; ensuring the security of the software installation process by providing access to the software image from a security monitor using security policies.

In another example, implementation of the security policies 121 using temporal logic is further described. When this approach is used, certain communications between processes 131-132 in the OS 100 are associated with events of the state of the software image 230 from a set which is defined in accordance with security goals. In an embodiment, such set includes the following events: {seal, verify, apply}, where "seal" is the event of "sealing" the software image 230, "verify" is the event of verifying the integrity of the software image 230, and "apply" is the event of installing the software from the software image 230. The security properties (requirements) are defined using a temporal logic formula—for example, as follows:

Property 1. When the integrity of a software image 230 is verified, it must be always guaranteed that, after the process of verification of the software image 230, the software image 230 will not be modified. When the same arrangement as in the case of a finite state machine is used, this property can be written as the following formula:

$G(\text{verify} => P \text{ seal})$, where G is the "always in the future" temporal operator, and P is the "at least once in the past" temporal operator.

Property 1 means that, every time the integrity of a software image 230 is verified, a file storage method 260, which guarantees the impossibility of further writing of data to the software image 230, must have been invoked in the past.

Property 2. Installation of software from the software image 230 is possible only if the integrity of the software image 230 is confirmed. This property can be written as the following formula:

$G(\text{apply} => P \text{ verify})$.

A policy class object, which controls access on the basis of temporal logic, can be created in the PSL language as the following phrase:

```
policy object tl_checker = tl {
    property "G (verify => P seal) /\ G (apply => P verify)"
}
```

It should be noted that other definitions of properties are also possible. For example, Property 2 can be set as follows: the software image 230 is not used until the integrity of the software image 230 is confirmed:

!apply U verify, where U is the "until the set event occurs" temporal operator.

Presented below is an example security policy 121 using temporal logic during software installation. The "control" policy associates the "apply" event with this inter-process communication and verifies the truth of the formula specified in the configuration of the policy object. If the formula is true, the policy permits the communication; if the formula is false, the policy denies it.

```
request src=Manager,
    dst=Installer,
        method=Install {
            tl_checker.control [apply];
        }
```

The verifier 240 informs the security monitor 120 of successful verification of the software image 230—the "verify" event:

```
security src=Verifier, method=Confirm {
    tl_checker.control [verify];
}
```

The "restart" method deletes all history of events of a "tl" class object.

```
request src=Manager,
    dst=Storage,
        method=Write {
            tl_checker, restart;
        }
```

When a "commit" method is called for, the software image 230 is "sealed".

```
request src=Manager,
    dst=Storage,
        method=Commit {
            tl_checker.control [seal];
        }
```

Since the installer 250 is considered to be a trusted component, it will read the software image 230 only at a command from the Manager 200, for which a security policy was set earlier.

Figure 6:
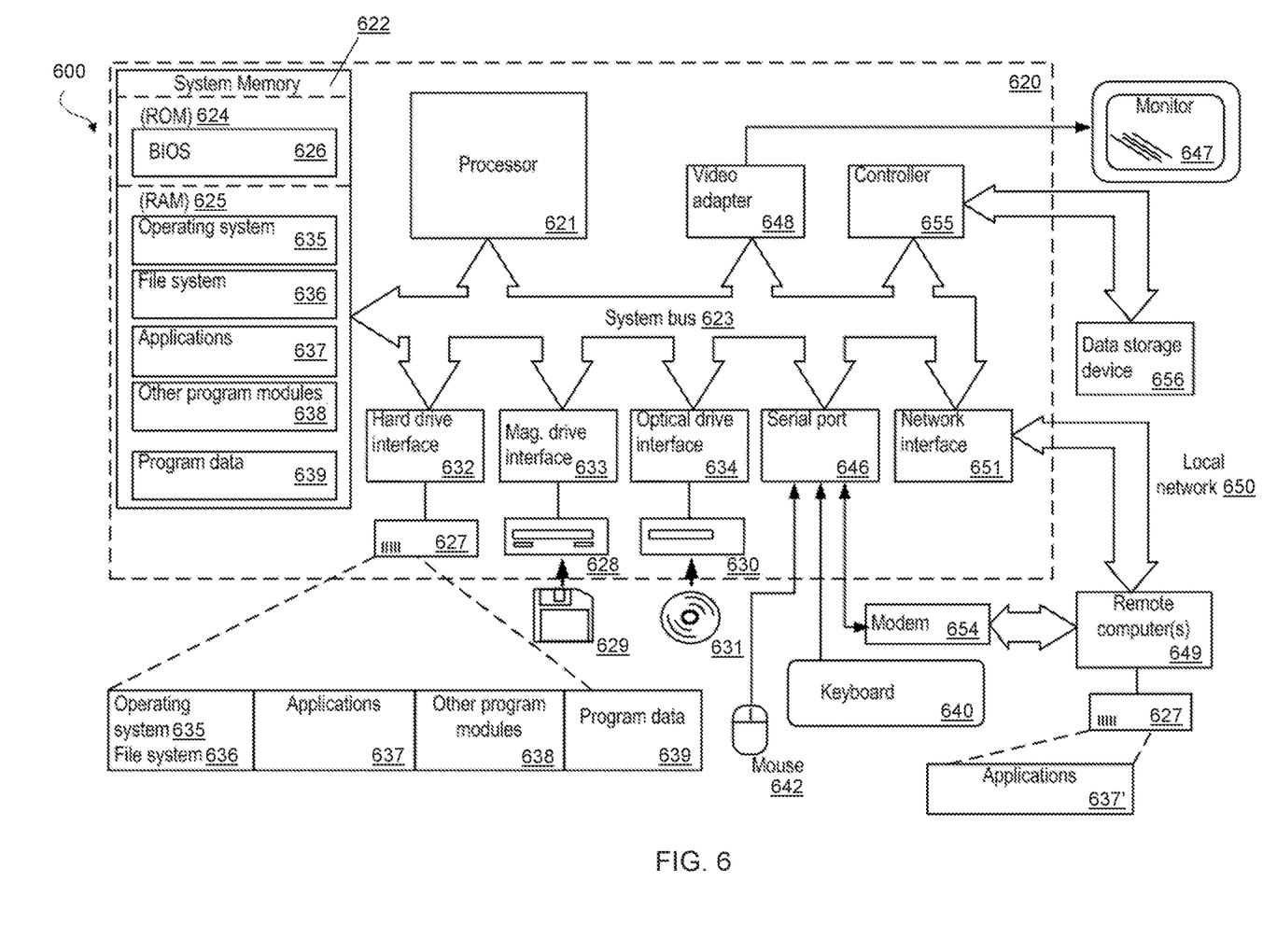
FIG. 6 is a block diagram of a computer system for implementing the systems and methods described herein, according to an embodiment.

Referring to FIG. 6, a diagram illustrating in greater detail a computer system 600 on which aspects of the disclosure as described herein may be implemented according to various embodiments is depicted.

The computer system 600 can comprise a computing device such as a personal computer 620 includes one or more processing units 621, a system memory 622 and a system bus 623, which contains various system components, including a memory connected with the one or more processing units 621. In various embodiments, processing units 621 can include multiple logical cores that are able to process information stored on computer readable media. The system bus 623 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 624 or volatile memory such as Random Access Memory (RAM) 625. The Basic Input/

Output System (BIOS) 626 contains basic procedures ensuring transfer of information between the elements of personal computer 620, for example, during the operating system boot using ROM 624.

Personal computer 620, in turn, has a hard drive 627 for data reading and writing, a magnetic disk drive 628 for reading and writing on removable magnetic disks 629, and an optical drive 630 for reading and writing on removable optical disks 631, such as CD-ROM, DVD-ROM and other optical media. The hard drive 627, the magnetic drive 628, and the optical drive 630 are connected with system bus 623 through a hard drive interface 632, a magnetic drive interface 633 and an optical drive interface 634, respectively. The drives and the corresponding computer information media represent energy-independent means for storage of computer instructions, data structures, program modules and other data on personal computer 620.

The system depicted includes hard drive 627, a removable magnetic drive 629 and a removable optical drive 630, but it should be understood that it is possible to use other types of computer media, capable of storing data in a computer-readable form (solid state drives, flash memory cards, digital disks, random-access memory (RAM), etc.), connected to system bus 623 through a controller 655.

The computer 620 comprises a file system 636, where the recorded operating system 635 is stored, as well as additional program applications 637, other program engines 638 and program data 639. The user can input commands and information into the personal computer 620 using input devices (keyboard 640, mouse 642). Other input devices (not shown) can also be used, such as: a microphone, a joystick, a game console, a scanner, etc. Such input devices are usually connected to the computer system 620 through a serial port 646, which, in turn, is connected to a system bus, but they can also be connected in a different way—for example, using a parallel port, a game port or a Universal Serial Bus (USB). The monitor 647 or another type of display device is also connected to system bus 623 through an interface, such as a video adapter 648. In addition to monitor 647, personal computer 620 can be equipped with other peripheral output devices (not shown), such as speakers, a printer, etc.

Personal computer 620 is able to work in a network environment; in this case, it uses a network connection with one or several other remote computers 649. Remote computer(s) 649 is (are) similar personal computers or servers, which have most or all of the above elements, noted earlier when describing the substance of personal computer 620 shown in FIG. 6. The computing network can also have other devices, such as routers, network stations, peering devices or other network nodes.

Network connections can constitute a Local Area Network (LAN) 650 and a Wide Area Network (WAN). Such networks are used in corporate computer networks or in corporate intranets, and usually have access to the Internet. In LAN or WAN networks, personal computer 620 is connected to the Local Area Network 650 through a network adapter or a network interface 651. When using networks, personal computer 620 can use a modem 654 or other means for connection to a world area network, such as the Internet. Modem 654, which is an internal or an external device, is connected to system bus 623 through serial port 646. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An installation system for protecting the installation of a software image, the installation system comprising:
computing hardware of at least one processor and a memory operably coupled to the at least one processor; and
instructions that, when executing on the computing hardware, cause the computing hardware to implement:
a security monitor engine configured to set an initial access state for the software image granting access to a verifier engine and to update the access state for the software image in accordance with at least one security policy,
the verifier engine configured to verify the integrity of the software image, and
an installer engine configured to install software contained in the software image according to the access state,
wherein the security monitor engine is further configured to: set a verifier integrity level for the verifier engine higher than a software image integrity level for the software image, and an installer integrity level for the installer engine higher than the software image integrity level for the software image, set a verifier access level for the verifier engine equal to the software image integrity level, set an installer engine access level equal to the installer integrity level, and set the at least one security policy to allow components of the verifier engine or the installer engine access to another component when the respective access level of a first component does not exceed the respective integrity level of a second component, wherein when the verifier engine successfully verifies the integrity of the software image, the security monitor engine is further configured to change the software image integrity level to be equal to the installer engine access level.

2. The installation system of claim 1, wherein after a determination by the verifier engine that the integrity of the software image is not compromised, the security monitor engine updates the access state to grant access to the installer engine.

3. The installation system of claim 2, wherein after a determination by the verifier engine that the integrity of the software image is not compromised, the security monitor engine updates the access state to deny access to the verifier engine.

4. The installation system of claim 1, wherein the initial access state for the software image further includes denying access to the installer engine, and wherein after a determination by the verifier engine that the integrity of the software image is compromised, the security monitor engine does not update the initial access state.

5. The installation system of claim 1, wherein the at least one security policy includes a finite state machine, wherein the finite state machine includes a state transition table utilizing the access state.

6. The installation of claim 1, wherein the at least one security policy includes temporal logic associated with events of a state of the software image.

7. The installation system of claim 1, wherein the software image includes a plurality of objects including at least one compromised object and at least one non-compromised object, and wherein the installer engine installs only the at least one non-compromised object.

8. The installation system of claim 1, wherein the verifier engine is configured to verify the integrity of the software image by determining that the software image is not modified or replaced.

9. The installation system of claim 8, wherein the verifier engine is configured to determine that the software image is not modified or replaced includes at least one of:
   checking a digital signature of the software image;
   receiving a confirmation from a user;
   using a message authentication code;
   checking whether a user role satisfies at least one user role requirement; and
   verifying predetermined attributes of the software image.

10. A method for protecting the installation of a software image, comprising:
    setting an initial access state for the software image granting access to a verifier engine and to update the access state for the software image in accordance with at least one security policy;
    verifying, with the verifier engine, the integrity of the software image; installing, with an installer engine, software contained in the software image according to the access state; and
    by a security monitor engine, setting a verifier integrity level for a verifier engine higher than a software image integrity level for the software image, and an installer integrity level for an installer engine higher than the software image integrity level for the software image, wherein the verifier engine is configured to verify the integrity of the software image, and the installer engine is configured to install software contained in the software image, setting a verifier access level for the verifier engine equal to the software image integrity level, setting an installer engine access level equal to the installer integrity level, and setting at least one security policy to allow components of the verifier engine or the installer engine access to another component when the respective access level of a first component does not exceed the respective integrity level of a second component, wherein when the verifier engine successfully verifies the integrity of the software image, the security monitor engine is further configured to change the software image integrity level to be equal to the installer engine access level.

11. The method of claim 10, further comprising:
    after a determination that the integrity of the software image is not compromised, updating the access state to grant access to the installer engine.

12. The method of claim 11, further comprising:
    after a determination that the integrity of the software image is not compromised, updating the access state to deny access to the verifier engine.

13. The method of claim 10, wherein setting the initial access state for the software image further includes denying access to the installer engine, the method further comprising:
    after a determination that the integrity of the software image is compromised, not updating the initial access state.

14. The method of claim 10, wherein the at least one security policy includes a finite state machine, wherein the finite state machine includes a state transition table utilizing the access state.

15. The method of claim 10, wherein the at least one security policy includes temporal logic associated with events of a state of the software image.

16. The method of claim 10, wherein the software image includes a plurality of objects including at least one compromised object and at least one non-compromised object, and wherein the installer engine installs only the at least one non-compromised object.

17. The method of claim 10, wherein verifying the integrity of the software image includes determining that the software image is not modified or replaced.

18. The method of claim 17, wherein verifying the integrity of the software image includes determining that the software image is not modified or replaced includes at least one of:
    checking a digital signature of the software image;
    receiving a confirmation from a user;
    using a message authentication code;
    checking whether a user role satisfies at least one user role requirement; and
    verifying predetermined attributes of the software image.

19. A system for protecting the installation of a software image, the system comprising:

computing hardware of at least one processor and a memory operably coupled to the at least one processor; and instructions that, when executing on the computing hardware, cause the computing hardware to implement:

a security monitor engine configured to:
  set a verifier integrity level for a verifier engine higher than a software image integrity level for the software image, and an installer integrity level for an installer engine higher than the software image integrity level for the software image, wherein the verifier engine is configured to verify the integrity of the software image, and the installer engine is configured to install software contained in the software image,
  set a verifier access level for the verifier engine equal to the software image integrity level,
  set an installer engine access level equal to the installer integrity level, and
  set at least one security policy to allow components of the verifier engine or the installer engine access to another component when the respective access level of a first component does not exceed the respective integrity level of a second component,
  wherein when the verifier engine successfully verifies the integrity of the software image, the security monitor engine is further configured to change the software image integrity level to be equal to the installer engine access level.

20. The system of claim 19, wherein the security monitor engine is further configured to grant access to the software image of the verifier engine and the installer engine according to the at least one security policy.

\* \* \* \* \*